(12) United States Patent
Danneberg et al.

(10) Patent No.: US 12,454,171 B2
(45) Date of Patent: Oct. 28, 2025

(54) UNDERBODY ARRANGEMENT

(71) Applicant: Bayerische Motoren Werke Aktiengesellschaft, Munich (DE)

(72) Inventors: Jan Danneberg, Munich (DE); Ronny Grosse, Eichenau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 462 days.

(21) Appl. No.: 17/913,476

(22) PCT Filed: Apr. 23, 2021

(86) PCT No.: PCT/EP2021/060651
§ 371 (c)(1),
(2) Date: Sep. 22, 2022

(87) PCT Pub. No.: WO2021/219504
PCT Pub. Date: Nov. 4, 2021

(65) Prior Publication Data
US 2023/0133645 A1 May 4, 2023

(30) Foreign Application Priority Data
Apr. 27, 2020 (DE) .................... 10 2020 111 356.0

(51) Int. Cl.
*B62D 25/20* (2006.01)
*B60K 1/04* (2019.01)
*B60R 16/02* (2006.01)

(52) U.S. Cl.
CPC ............ *B60K 1/04* (2013.01); *B60R 16/0207* (2013.01); *B62D 25/20* (2013.01); *B62D 25/2036* (2013.01); *B60K 2001/0438* (2013.01)

(58) Field of Classification Search
CPC ... B60K 1/04; B60K 2001/0438; Y02E 60/10; H01M 50/207; H01M 50/244; H01M 50/249; H01M 2220/20
See application file for complete search history.

(56) References Cited

U.S. PATENT DOCUMENTS 4,593,949 A * 6/1986 Tanimoto ............. B62D 25/025
296/193.07
6,188,574 B1 2/2001 Anazawa
(Continued)

FOREIGN PATENT DOCUMENTS

CN 107379949 A 11/2017
CN 109278873 A * 1/2019 ................ B60J 5/06
(Continued)

OTHER PUBLICATIONS

International Search Report (PCT/ISA/210) issued in PCT Application No. PCT/EP2021/060651 dated Jun. 15, 2021 with English translation (four (4) pages).
(Continued)

*Primary Examiner* — Steve Clemmons
(74) *Attorney, Agent, or Firm* — Crowell & Moring LLP

(57) ABSTRACT

An underbody arrangement of a high-voltage storage device, which is overlapping with a floor panel of an electrically operable motor vehicle, in which the floor panel having at least one opening is arranged at least in some regions in the direction of the vehicle height so as to overlap with the high-voltage storage device, which includes a plurality of battery cells arranged on a base element. The at least one opening is arranged in the direction of the vehicle height so as to overlap with the base element of the high-voltage storage device and without overlap with the battery cells of the high-voltage storage device.

3 Claims, 1 Drawing Sheet

(56) References Cited

U.S. PATENT DOCUMENTS

| | | | |
|---|---|---|---|
| 7,407,223 B2 * | 8/2008 | Ito | B62D 25/20 |
| | | | 296/193.07 |
| 7,695,056 B2 * | 4/2010 | Hanson, Jr. | B62D 25/2018 |
| | | | 296/193.07 |
| 8,210,301 B2 | 7/2012 | Hashimoto et al. | |
| 8,272,465 B2 * | 9/2012 | Takeshita | B62D 25/2072 |
| | | | 180/69.1 |
| 9,746,077 B2 * | 8/2017 | Harwin | B62D 25/24 |
| 2007/0257519 A1 | 11/2007 | Hanson, Jr. et al. | |
| 2012/0091762 A1 * | 4/2012 | Pohl | B62D 25/025 |
| | | | 296/209 |
| 2013/0126254 A1 | 5/2013 | Lee et al. | |
| 2013/0229030 A1 | 9/2013 | Yamaguchi et al. | |
| 2016/0114699 A1 | 4/2016 | Hokazono et al. | |
| 2017/0305249 A1 | 10/2017 | Hara | |
| 2021/0094624 A1 * | 4/2021 | Takahashi | B62D 25/2036 |
| 2021/0147005 A1 * | 5/2021 | Yokoyama | H02G 3/088 |

FOREIGN PATENT DOCUMENTS

| | | | | |
|---|---|---|---|---|
| DE | 10 2010 061 157 A1 | | 6/2012 | |
| DE | 10 2017 003 720 B3 | | 12/2017 | |
| DE | 102019100748 A1 | * | 7/2019 | ............... B60K 1/04 |
| EP | 1609702 A1 | * | 12/2005 | ............ B60R 13/083 |
| EP | 2141064 A1 | * | 1/2010 | ......... B62D 25/2036 |
| JP | 2000185671 A | * | 7/2000 | |
| JP | 2014-80116 A | | 5/2014 | |
| JP | 2014080116 A | * | 5/2014 | |
| KR | 10-2011-0048856 A | | 5/2011 | |
| WO | WO-2006054022 A1 | * | 5/2006 | ............... B60P 3/423 |
| WO | WO 2014/034422 A1 | | 3/2014 | |

OTHER PUBLICATIONS

German-language Written Opinion (PCT/ISA/237) issued in PCT Application No. PCT/EP2021/060651 dated Jun. 15, 2021 (six (6) pages).

German-language Office Action issued in German Application No. 10 2020 111 356.0 dated Mar. 23, 2021 (eight (8) pages).

English-translation of Chinese-language Office Action issued in Chinese Application No. 202180021346.8 dated Feb. 26, 2025 (9 pages).

* cited by examiner

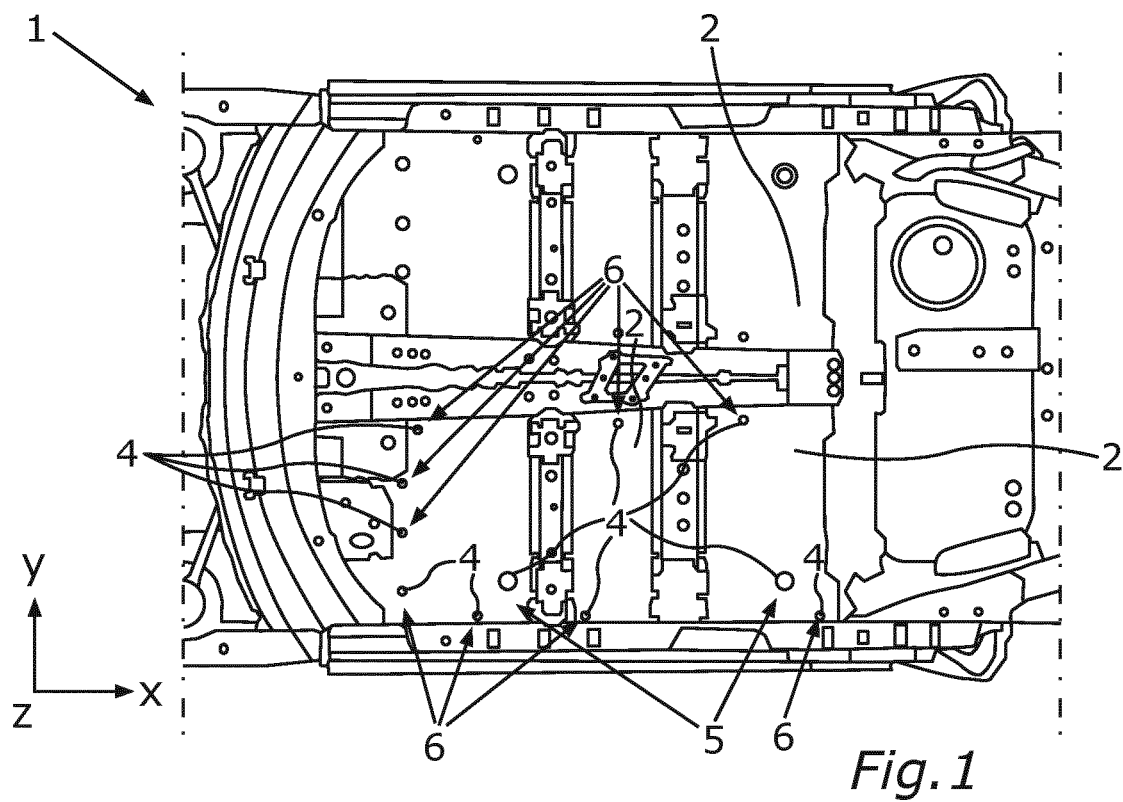
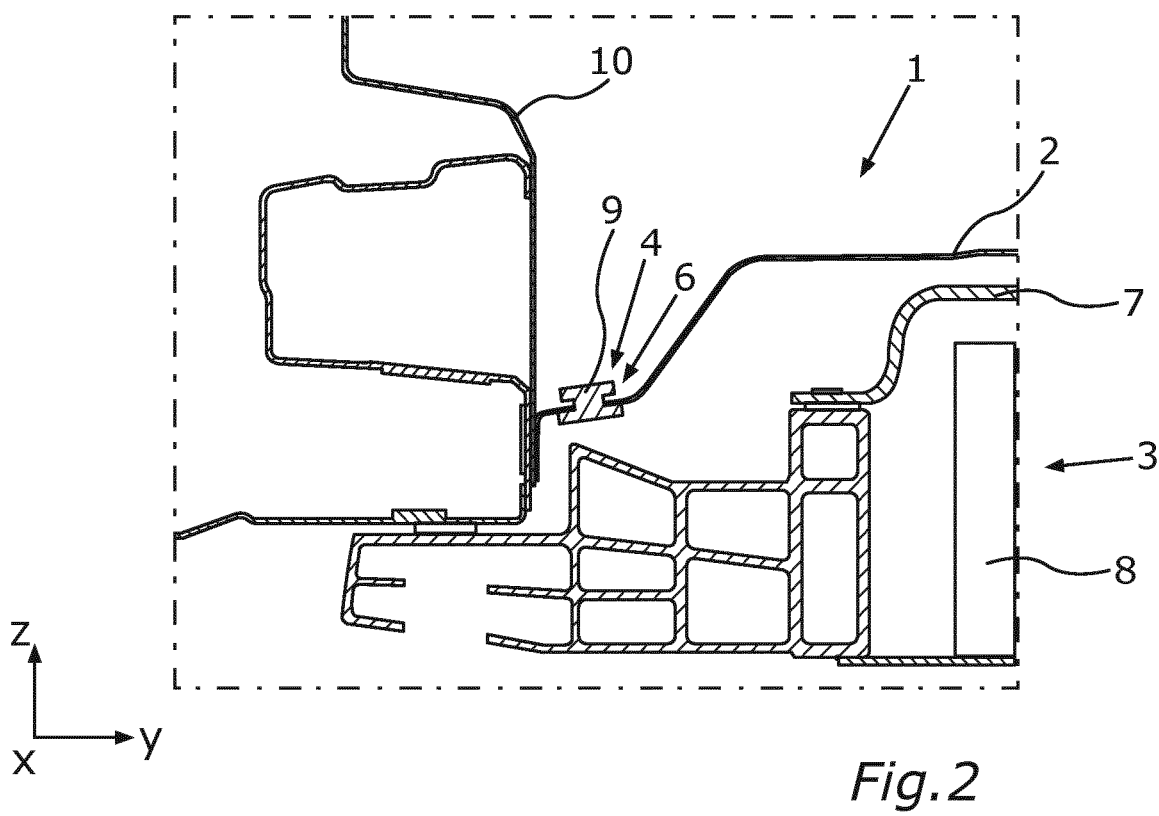

UNDERBODY ARRANGEMENT

BACKGROUND AND SUMMARY

The invention relates to an underbody arrangement of a high-voltage storage device in overlapping arrangement with a floor panel of an electrically operable motor vehicle.

Such an underbody arrangement is already known, for example, from US 2013/0229030 A1, from U.S. Pat. No. 8,210,301 B2 and from U.S. Pat. No. 6,188,574 B1. In each of these underbody arrangements, a floor panel having at least one opening overlaps a high-voltage storage device, which comprises a plurality of battery cells (8), at least in some regions upwardly in the direction of the vehicle height.

An arrangement for closing at least one body opening in the floor panel of a motor vehicle is already known from DE 10 2017 003 720 B3. The arrangement comprises a floor panel with at least one body opening and also at least one underfloor battery arranged below the floor panel. Furthermore, the arrangement comprises at least one foam pad, which is arranged on the upper side of the underfloor battery and which closes the body opening. The body opening can serve in particular as a paint drain during a painting process.

The object of the present invention is to provide an underbody arrangement with a particularly low height which is particularly favorable to paint.

This object is achieved in accordance with the invention by an underbody arrangement having the features of the independent claim. Advantageous embodiments of the invention are the subject of the dependent patent claims and the description.

A first aspect of the invention relates to an underbody arrangement of a high-voltage storage device in overlapping arrangement with a floor panel of an electrically operable motor vehicle. In the underbody arrangement, it is provided that the floor panel having at least one opening is arranged overlapping with the high-voltage storage device at least in some regions in the direction of the vehicle height.

The high-voltage storage device comprises a plurality of battery cells of the high-voltage storage device arranged on a base element. The battery cells are configured to provide electrical energy for an electric drive of the motor vehicle. The motor vehicle can thus be electrically operated or electrically driven by means of the energy from the battery cells.

The at least one opening in the floor panel can be provided during manufacture of the floor panel. In this case, the at least one opening in the floor panel can allow a medium to drain away from the floor panel. This means that the medium can drain away from the floor panel via the at least one opening. The floor panel overlaps the high-voltage storage device at least in some regions upwardly in the direction of the vehicle height and thus towards a vehicle interior of the motor vehicle. As a result, the high-voltage storage device can be protected from damage by means of the floor panel on the one hand, and on the other hand the high-voltage storage device can be concealed from the vehicle interior of the motor vehicle by means of the floor panel.

In order to be able to provide the underbody arrangement with a particularly low installation space requirement in the direction of the vehicle height and thus with a particularly compact height, it is provided in accordance with the invention that the at least one opening in the direction of the vehicle height is in overlapping arrangement with the base element of the high-voltage storage device and is without overlap with the battery cells of the high-voltage storage device. This means that the opening in the direction of the vehicle height overlaps the high-voltage storage device, wherein the opening does not, however, overlap any of the battery cells of the high-voltage storage device in the direction of the vehicle height. In particular areas in which the high-voltage storage device comprises the battery cells, the high-voltage storage device usually has a greatest height in the direction of the vehicle height. By arranging the at least one opening in the floor panel without overlap with the battery cells of the high-voltage storage device in the direction of the vehicle height, the underbody arrangement can be formed with a particularly small height in the direction of the vehicle height.

In particular, if the at least one opening in the floor panel is arranged in a depression of the floor panel or if a further motor vehicle component is arranged over the opening in the floor panel on the floor panel, the height of the underbody arrangement in the direction of the vehicle height can be kept particularly small, if the at least one opening in the floor panel is arranged without overlap of the battery cells of the high-voltage storage device in the direction of the vehicle height, since there is no addition of a height of the underbody arrangement caused by the battery cells of the high-voltage storage device, or of a height requirement of the floor panel caused by the opening.

In order to enable a particularly compact design of the underbody arrangement and thus a particularly low height of the underbody arrangement in the overlap direction, the at least one opening is in overlapping arrangement with the base element of the high-voltage storage device in the overlap direction and without overlap with the battery cells of the high-voltage storage device. Due to the overlap-free arrangement of the at least one opening in the direction of the vehicle height in the overlap direction above the battery cells of the high-voltage storage device, installation space for a closure element can be provided in the region of the at least one opening, for example for a closure element for closing the at least one opening and/or a fastening element for fastening a motor vehicle component of the motor vehicle. Due to the overlap-free arrangement of the at least one opening in the overlap direction with the battery cells of the high-voltage storage device, this installation space to be provided is also arranged overlap-free in the overlap direction with the battery cells of the high-voltage storage device, as a result of which the underbody arrangement can be provided with a particularly low height in the overlap direction and thus in a particularly compact manner.

It has proven to be advantageous here that the at least one opening is arranged in the vehicle transverse direction between a vehicle doorsill laterally adjacent to the floor panel and a battery cell nearest to the vehicle doorsill in the vehicle transverse direction. In other words, the at least one opening in the floor panel is arranged in a side region of the floor panel which extends in the direction of the vehicle height in overlap with an edge region of the high-voltage storage device which extends in the vehicle transverse direction from an outermost edge of an outermost battery cell to the edge of the high-voltage storage device. This edge region additionally extends in the vehicle longitudinal direction from an outermost edge of an outermost battery cell to the edge of the high-voltage storage device. Thus, a region extending at a shortest distance from the at least one opening in the vehicle transverse direction to a vehicle doorsill adjoining the floor panel is kept free of battery cells over an entire height of the vehicle. In the edge region in particular, the floor panel can be at a smaller distance from the base element of the high-voltage storage device than in a central region in which the floor panel is in overlapping arrangement with the battery cells of the high-voltage storage device in the direction of the vehicle height. As a result, the installation space for fastening the motor vehicle component can be provided in the edge region, for example, and/or the plug element can be arranged in the at least one opening in the floor panel, wherein the underbody arrangement has a particularly low height in the direction of the vehicle height and thus a particularly compact design.

In this context, it has proven to be particularly advantageous if the at least one opening is arranged at the lowest point of the floor panel in the direction of the vehicle height. In this case, the opening can serve as a media drain from the floor panel, in particular as a paint drain from the floor panel. For example, in the course of cathodic dip painting, the floor panel can be coated with the paint, wherein excess paint can drain away from the floor panel via the at least one opening in the floor panel, whereby a particularly uniform coating thickness of the floor panel can be achieved. By arranging the at least one opening at the lowermost point of the floor panel in the direction of the vehicle height, complete draining of the medium, in particular of the excess paint, away from the floor panel can be ensured, whereby accumulation of the medium in at least one region of the floor panel can be avoided at least substantially. A forming of different layer thicknesses of the coating due to media accumulations, in particular accumulations of paint, can be at least substantially avoided by the provision of the at least one opening at the lowermost point of the floor panel in the direction of the vehicle height.

It has further proven to be advantageous if the floor panel has a plurality of depressions, each of which comprises at least one associated opening. In other words, at least one opening is provided for each depression of the floor panel, and a medium can flow out of the depression in question via said at least one opening. This ensures that there is no media accumulation in the depression in question or in any depressions of the floor panel.

In a further embodiment of the invention, it has been shown to be advantageous if the at least one opening is closed with a plug element and/or if a motor vehicle component of the motor vehicle is received on the floor panel via the at least one opening. This means that the at least one opening in the floor panel serves as a media drain from the floor panel within the scope of a manufacturing process of the floor panel, wherein the at least one opening in the floor panel can be closed with the plug element following the manufacture of the floor panel, as a result of which the high-voltage storage device can be tightly shielded upwards and thus from a vehicle interior of the motor vehicle by means of the floor panel. A liquid inflow via the at least one opening in the floor panel to the high-voltage storage device can be at least substantially avoided by closing the at least one opening in the floor panel by means of the plug element. In addition, by closing the at least one opening in the floor panel, it can be ensured that no or particularly little dust and/or soiling reaches the high-voltage storage device via the at least one opening. This means that the risk of contamination of the high-voltage storage device can be kept particularly low, especially in the case of a body-integrated arrangement of the high-voltage storage device. In the case of the body-integrated arrangement of the high-voltage storage device, the floor panel delimits a housing interior of the high-voltage storage device and thus provides part of a housing of the high-voltage storage device. The floor panel can furthermore be configured alternatively or additionally to separate a wet compartment from a dry compartment of the motor vehicle. Thus, by closing the at least one opening by means of the plug element, the vehicle interior can be protected from an entry of liquid or soiling via the opening. Particularly in the case of a design of the high-voltage storage device completely enclosed by a housing, said high-voltage storage device being arranged below the floor panel in the direction of the vehicle height, liquid can enter an intermediate space between the housing of the high-voltage storage device and the floor panel. By means of the plug element, entry of the liquid from the intermediate space into the vehicle interior via the at least one opening can be at least substantially prevented.

In the alternative or additional embodiment of the invention, it is provided that the motor vehicle component of the motor vehicle is received on the floor panel via the at least one opening. This means that the motor vehicle component of the motor vehicle is attached to the floor panel via the at least one opening and is thus mounted on the floor panel. In this case, the motor vehicle component can be positioned relative to the floor panel via the opening and then can be connected to the floor panel. The at least one opening in the floor panel is thus a receiving hole, via which the motor vehicle component is to be held on the floor panel. When the at least one opening in the floor panel is designed as the fastening opening, the motor vehicle component and/or a fastening element for fastening the motor vehicle component are to be introduced into the at least one opening in the floor panel via the opening on the floor panel, so that installation space for the region of the motor vehicle component inserted through the at least one opening in the floor panel and/or the fastening element is to be provided on the side of the floor panel facing the high-voltage storage device in the region of the opening. If the at least one opening in the floor panel is arranged in the direction of the vehicle height without overlap with the battery cells of the high-voltage storage device, this installation space to be provided is likewise arranged in the direction of the vehicle height without overlap with the battery cells of the high-voltage storage device, as a result of which the underbody arrangement can be designed to be particularly compact in the upward direction of the vehicle z.

In a further embodiment of the invention, it has proven to be advantageous if a wiring harness is provided which is in overlapping arrangement with the at least one opening in the direction of the vehicle height. In particular, the wiring harness is arranged without overlap with the battery cells of the high-voltage storage device in the direction of the vehicle height. As a result, the underbody arrangement can be provided with a particularly low height along the direction of the vehicle height. Consequently, the underbody arrangement has a particularly compact design when the wiring harness is arranged in the direction of the vehicle height in overlap with the at least one opening.

It has proven to be particularly advantageous if a medium drains away from the floor panel via the at least one opening. This means that, in particular during production of the floor panel, a medium is applied to the floor panel and can drain away from the floor panel via the at least one opening. In this case, the at least one opening enables a particularly large amount of the medium applied to the floor panel to drain away from the floor panel. In particular, for a particularly advantageous drainage of the medium away from the floor panel, the at least one opening in the floor panel is to be provided at a local or global minimum and thus at a depression of the floor panel in order to avoid an accumulation of the medium on the floor panel. By providing the local or global minimum of the floor panel in the region of the opening, an installation space requirement of the floor panel in the overlap direction, or rather in the direction of the vehicle height, is specified.

In this context, it has proven to be particularly advantageous if the floor panel is cleaned with a cleaning liquid as medium and the cleaning liquid drains away from the floor panel via the at least one opening. The at least one opening thus allows the cleaning liquid to drain away from the floor panel to a particularly large extent, as a result of which the floor panel can be dried particularly easily and cleaning liquid can be removed particularly free of residue.

In addition, it has been shown to be advantageous if the floor panel is coated with a paint in a cathodic dip coating process and excess paint drains away from the floor panel via the at least one opening. The at least one opening in the floor panel allows excess paint accumulating during the coating of the floor panel to drain away from the floor panel via the at least one opening, as a result of which a particularly uniform layer thickness of the paint can be achieved on the floor panel. In this way, a particularly uniform coating of the floor panel can be achieved. In a manufacturing process for the floor panel, the floor panel can be wetted with the cleaning liquid for cleaning the floor panel in a manufacturing step and can be coated with the paint beforehand or afterwards as part of the cathodic dip coating process.

Further features of the invention will become clear from the claims, the figures, and the figure description. The features and combinations of features mentioned above in the description, as well as the features and combinations of features mentioned below in the figure description and/or shown alone in the figures, can be used not only in the combination indicated in each case, but also in other combinations or on their own.

The invention will now be explained in more detail with reference to a preferred exemplary embodiment and with reference to the drawings.

BRIEF DESCRIPTION OF THE DRAWINGS

FIG. 1 is a schematic plan view of an underbody arrangement with a plurality of floor panels which are in overlapping arrangement with a high-voltage storage device in the direction of the vehicle height, wherein the various floor panels have at least one opening which is in overlapping arrangement with the high-voltage storage device in the direction of the vehicle height, moreover without overlap with any battery cells of the high-voltage storage device.

FIG. 2 is a schematic sectional view of a detail of the underbody arrangement with the floor panel overlapping the high-voltage storage device in the direction of the vehicle height, the at least one opening of the floor panel being in overlapping arrangement with the high-voltage storage device in the direction of the vehicle height and without overlap with any of the battery cells of the high-voltage storage device, wherein the at least one opening in the floor panel is closed by a plug element.

DETAILED DESCRIPTION OF THE DRAWINGS

FIG. 1 shows a schematic plan view of an underbody arrangement 1 of an electrically operable motor vehicle in the direction of the vehicle height z from above. The underbody arrangement 1 comprises at least one, in the present case a plurality of, floor panels 2, each of which overlaps a high-voltage storage device 3 in the direction of the vehicle height z. Each of the floor panels 2 has at least one opening 4. The openings 4 in the floor panels 2 are arranged to overlap with the high-voltage storage device 3 in the direction of the vehicle height z. The first openings 5 are thus respective main receptacles for the motor vehicle component, which may be embossed upwards. The motor vehicle component may be, in particular, a body component. The first openings 5 can be at least conditionally suitable for paint drainage. In the present case, at least one second opening 6 is provided on at least one of the floor panels 2, and a medium applied to a particular floor panel 2 can drain away from the floor panel 2 via said at least one second opening. In particular, the various floor panels 2 are shaped in such a way that the second openings 6 are arranged at lowest points and thus in depressions, which are global and/or local minima of the floor panel 2 in question in the direction of the vehicle height z. A particular medium applied to the floor panel 2 can flow in the direction of the second opening 6 at least substantially without interference from beads of the corresponding floor panel 2 that are embossed upwardly in the direction of the vehicle height z. In particular, the various floor panels 2 are free of corresponding beads embossed upwards in the direction of the vehicle height z. In order to enable a corresponding, particularly advantageous drainage of the medium from a particular floor panel 2, it is provided that the particular floor panel 2 has the at least one second opening 6 both at its lowermost point and in respective optionally provided depressions at a corresponding lowermost point in the direction of the vehicle height z. As a medium, a paint of a cathodic dip painting process or a cleaning medium of a cleaning process of the particular floor panel 2 can flow through the respective second openings 6. In order to prevent liquid from flowing through the opening 4 in the floor panel 2 and/or to prevent soiling from passing through the opening 4 in the floor panel 2 to the high-voltage storage device 3, the at least one opening 4 in the floor panel 2 is closed by a plug element 9.

The underbody arrangement 1 is shown in FIG. 2 in a schematic sectional view, in which it can be seen that the at least one opening 4 in the floor panel 2 is in overlapping arrangement with the high-voltage storage device 3, in particular a base element 7 of the high-voltage storage device 3, in the direction of the vehicle height z and is arranged without overlap with various battery cells 8 of the high-voltage storage device 3. The battery cells 8 can be held on the base element 7. In the present case, the base element 7 is a storage cover of the high-voltage storage device 3, by means of which the battery cells 8 are overlapped upwards in the direction of the vehicle height z. In a first region intersecting a particular battery cell 8 in the direction of the vehicle height z, the high-voltage storage device 3 has a greater height in the direction of the vehicle height z than in a second region which does not overlap with the battery cells 8 of the high-voltage storage device 3 in the direction of the vehicle height z, in the present case an edge region of the high-voltage storage device 3. In this second region, the high-voltage storage device 3 is thus flattened in terms of its height in the direction of the vehicle height z. In this flattened region of the high-voltage storage device 3, the opening 4 in the floor panel 2 is in overlapping arrangement in the direction of the vehicle height z. Thus, the local or global minimum of the floor panel 2 in which the opening 4 is arranged is in overlapping arrangement with the flattened edge region and thus with the second region of the high-voltage storage device 3 in the direction of the vehicle height z, as a result of which the underbody arrangement 1 is designed to be particularly compact in terms of installation space in the direction of the vehicle height z.

In order to provide a particularly compact design of a vehicle floor of the motor vehicle comprising the underbody arrangement 1, a wiring harness, in particular a main wiring harness, which extends along the vehicle longitudinal direction x, can be arranged to overlap with the at least one opening 4 in the direction of the vehicle height z. This means that the wiring harness overlaps the at least one opening 4 upwards in the direction of the vehicle height z. In particular, the wiring harness, in the direction of the vehicle height z, is arranged in overlapping arrangement with a side region of the floor panel 2 adjacent to a vehicle doorsill 10. At least two motor vehicle components can be electrically connected to one another via the wiring harness. The arrangement of the wiring harness in overlap with the at least one opening 4 in the floor panel 2 allows the vehicle floor of the motor vehicle to be provided with a particularly low height along the direction of the vehicle height z.

In a method for providing the underbody arrangement 1, the floor panel 2 is provided first. Within the scope of providing the floor panel 2, the floor panel 2 can be acted upon by the medium, which can at least partially flow away from the floor panel 2 via the at least one second opening 6. Subsequently, the at least one opening 4 in the floor panel 2 is closed with the plug element 9 and the floor panel 2 is in overlapping arrangement with the high-voltage storage device 3 in the direction of the vehicle height z, wherein the at least one opening 4 in the floor panel 2 is in overlapping arrangement with the base element 7 in the direction of the vehicle height z and is without overlap with the battery cells 8 of the high-voltage storage device 3. In the present case, the at least one opening 4 in the floor panel 2 is in overlapping arrangement with the edge region of the high-voltage storage device 3 in the direction of the vehicle height z, as a result of which the at least one opening 4 is arranged in the vehicle transverse direction y between the vehicle doorsill 10 arranged laterally next to the floor panel 2 in the vehicle transverse direction y and a battery cell 8 nearest to the vehicle doorsill 10 in the vehicle transverse direction y. The floor panel 2 can adjoin an end wall and/or a heel plate and/or the vehicle doorsill 10 outwardly in the vehicle longitudinal direction x and/or in the vehicle transverse direction y. The at least one opening 4 is thus arranged further outwardly in the vehicle transverse direction y than the particular battery cell 8 of the high-voltage storage device 3 that is nearest to the opening 4. As a result, the at least one opening 4 in the floor panel 2 is in overlapping arrangement with the flattened edge region of the high-voltage storage device 3 in the direction of the vehicle height z, as a result of which the underbody arrangement 1 is provided with a particularly small thickness in the direction of the vehicle height z.

The underbody arrangement 1 described is based on the knowledge that, for a painting process, due to a trough geometry of the at least one floor panel 2, the second openings 6 are to be provided for a media drain, in the present case in the context of a cathodic dip painting process or for liquids from cleaning baths of a cleaning process. The at least one second opening 6, which is provided for the discharge of media from the floor panel 2, should if possible be located at a point of the floor panel 2 which is lowest in the direction of the vehicle height z, so that the medium collects there for drainage. Furthermore, it is expedient to use the at least one opening 4 as a receiving hole for the motor vehicle component, which is why a grid-parallel arrangement of the openings 4 is advantageous. The openings 4 can be used as holes for adhesion of the cathodic dip coating for profiles of the motor vehicle lying in an under-floor area, wherein the adhesion is caused by an electric field applied as part of the cathodic dip coating process.

The second openings 6 are each to be closed with a plug element 9. This plug element 9 usually represents a lowest point in a dimensional chain constituted by "floor panel 2 to high-voltage storage cover". Since it is often not possible to emboss the high-voltage storage cover locally downward, in particular due to a narrow point to the battery cells 8, wherein a trough geometry in the high-voltage storage cover means an accumulation of water and thus entails a risk of corrosion in the case of steel covers, the plug element 9 is often decisive for a dimensional chain in the direction of the vehicle height z. In the case of a particularly large dimensional chain of the underbody arrangement 1 in the direction of the vehicle height z, an interior of the motor vehicle is particularly small in height and/or the high-voltage storage device 3 is to be kept particularly small in height in the direction of the vehicle height z and/or the motor vehicle is to be raised and/or a ground clearance is to be lowered.

In the underbody arrangement 1 described in conjunction with the figures, there is an optimized arrangement of the openings 4 in the particular floor panel 2, which is a vehicle floor. In the present case, the openings 4 are provided in the side region of the floor panel 2 adjacent to the vehicle doorsill 10. In the edge region of the high-voltage storage device 3 in overlapping arrangement with the side region in the direction of the vehicle height z, a height of the high-voltage storage device 3 is lower than a maximum height of the high-voltage storage device 3 in the direction of the vehicle height z, since the edge region in the direction of the vehicle height z is formed free of battery cells 8.

A geometry of the floor panel 2, in particular an arrangement of beads as well as motor vehicle components welded to the floor panel 2, allow liquid to flow off undisturbed into the side region of the floor panel 2, which is lower than a central region and in which the liquid can drain off from the floor panel 2 via the at least one opening 4.

Overall, the invention shows how a floor structure for an electrically operable motor vehicle with a paint drain optimized in respect of installation space can be provided.

LIST OF REFERENCE SIGNS 1 underbody arrangement
2 floor panel
3 high-voltage storage device
4 opening
5 first opening
6 second opening
7 base element
8 battery cell
9 plug element
10 vehicle doorsill

The invention claimed is:

1. An underbody arrangement of an electrically operable motor vehicle having a high-voltage storage device with a plurality of storage cells, comprising:
 a floor panel of the electrically operable motor vehicle that is configured for an overlapping arrangement, at least in some regions, with the high-voltage storage device, upwardly in a direction of a vehicle height, wherein
 the floor panel has at least one opening that is arranged in a depression of the floor panel which is a lowest point of the floor panel in the direction of the vehicle height, which opening is provided for drainage of a medium away from the depression of the floor panel via the at least one opening in the depression of the floor panel and is arranged in the direction of the vehicle height so as to overlap the high-voltage storage device, but is arranged without overlap with the battery cells of the high-voltage storage device between a vehicle doorsill laterally adjacent to the floor panel and a battery cell nearest to the vehicle doorsill in a vehicle transverse direction, the high-voltage storage device has a storage cover, wherein the storage cover has a first region that overlaps at least a storage cell of the plurality of storage cells in the direction of the vehicle height and a second region that does not overlap the plurality of storage cells in the direction of the vehicle height, wherein the second region is flattened in terms of its height in the direction of the vehicle height, and wherein the first region has a greater height in the direction of the vehicle height than the flattened second region, the at least one opening in the depression of the floor panel which is the lowest point of the floor panel in the direction of the vehicle height is disposed below the first region of the storage cover of the high-voltage storage device in the direction of the vehicle height.

2. The underbody arrangement as claimed in claim 1, wherein the at least one opening is closed with a plug element, and/or a motor vehicle component of the motor vehicle is received on the floor panel via the at least one opening.

3. The underbody arrangement as claimed in claim 1, further comprising:

a wiring harness in overlapping arrangement with the at least one opening in the direction of the vehicle height.

* * * * *